United States Patent [19]

Keyser

[11] Patent Number: 4,788,937
[45] Date of Patent: Dec. 6, 1988

[54] OYSTER BED FOSTERING

[76] Inventor: George A. Keyser, Rte. 2, Box 1105, Lancaster, Va. 22503

[21] Appl. No.: 66,514

[22] Filed: Jun. 26, 1987

[51] Int. Cl.$^4$ .............................................. A01K 61/00
[52] U.S. Cl. ......................................................... 119/4
[58] Field of Search ............................................. 119/4

[56] References Cited

U.S. PATENT DOCUMENTS

| | | | |
|---|---|---|---|
| 611,199 | 9/1898 | Hendryx | 119/4 |
| 1,921,945 | 8/1933 | Robertson | 119/4 |
| 2,319,170 | 5/1943 | Toner | 119/4 |
| 3,298,354 | 1/1967 | Geer | 119/4 |
| 3,347,210 | 10/1967 | Golub | 119/4 |
| 3,430,607 | 3/1969 | Derouen | 119/4 |
| 3,455,278 | 7/1969 | Hunt | 119/4 |
| 3,552,357 | 1/1971 | Quayle | 119/4 |
| 3,556,052 | 1/1971 | Blount | 119/4 |
| 3,572,292 | 3/1971 | Quayle et al. | 119/4 |
| 3,678,900 | 7/1972 | Kolesa | 119/4 |
| 3,685,490 | 8/1972 | Adams | 119/4 |
| 3,701,338 | 10/1972 | McMillin | 119/4 |
| 3,738,318 | 6/1973 | Woodbridge et al. | 119/4 |
| 4,196,694 | 4/1980 | Buchanan | 119/4 |

Primary Examiner—Paul J. Hirsch
Attorney, Agent, or Firm—Roylance, Abrams, Berdo & Goodman

[57] ABSTRACT

The method of fostering shellfish beds, particularly oyster beds, by distributing chunks of rubber or rubber chips on the bottom of a body of water. The chunks of rubber or rubber chips may be produced by chopping or shredding old rubber tires into pieces ranging in dimension from one to four inches.

7 Claims, 1 Drawing Sheet

OYSTER BED FOSTERING

FIELD OF THE INVENTION

This invention relates to an improved method of fostering shellfish beds, particularly, beds of bivalves such as oysters.

BACKGROUND OF THE INVENTION

At the present time there is a constantly increasing demand for shellfish. Shellfish are not only used as seafood for consumption by humans, but are also in constant demand for the shells themselves. The value of, and the demand for these shells are constantly increasing. The shells are utilized in various technologies, such as for making lime which is employed as fertilizer, poultry grit, road surfaces (commonly in place of gravel), ballast for railroad track beds, etc.

While this invention has application for all shellfish, the use of the invention to foster oyster beds is emphasized herein for purposes of illustration.

This demand for oysters and their shells in this country has made the development of new oyster beds an attractive commercial venture. To date, the oyster industry has depended upon the collection of oyster larvae, known as "spat", on various natural underwater materials to which the spat attach themselves to promote new oyster growth. These underwater materials are known as cultch. The cultch material is distributed on exiting oyester beds or in new locations to start new oyster beds. The oysters are allowed to develop in these beds and are subsequently harvested when they reach a suitable size.

The selection of the clutch, which as stated, provides attachment points for the oyster spat, is of course important to the optimum development of the oyster beds. The spat must have cultch to attach to in order to mature.

A major factor in the selection of the cultch material is its ability to attract the oyster spat. Thus, the cultch material selected should remain where it is placed and not drift away in underwater currents or during storms. It is also desirable that the cultch resist sinking in sand or mud, otherwise, the spat would suffocate from the sediment deposits and die. Another consideration is that the cultch material is preferably non-corrosive so that it can be reused a number of times.

It is also important that the material chosen as cultch be resistant to the formation of slime thereon when placed on the oyster bed. The spat will reject the cultch if slime should form on its surface. Another factor in the selection of the cultch material is the ease with which the oysters can be removed from the cultch at harvest.

Cultch for oyster spat takes many forms of which oyster shells themselves are one of the most popular. However, the supply of oyster shells is not sufficiently abundent to meet this demand and the use of oyster shells as cultch is not economically feasible, due in part to the value of the shells for use in other technologies as discussed above. Alternatively, other materials have been used such as stones, bamboo, tiles, tarred ropes, tire rings, etc.

Examples of these prior attempts to form artificial cultch are disclosed in U.S. Pat. No. 611,199 to Hendryx, U.S. Pat. No. 1,921,945 to Robertson, U.S. Pat. No. 2,319,170 to Toner, U.S. Pat. No. 3,298,354 to Geer, U.S. Pat. No. 3,347,210 to Golub, U.S. Pat. No. 3,430,607 to Derouen, U.S. Pat. No. 3,455,278 to Hunt, U.S. Pat. No. 3,556,052 to Blount, U.S. Pat. No. 3,572,292 to Quayle et al, U.S. Pat. No. 3,685,490 to Adams, U.S. Pat. No. 3,701,338 to McMillin, U.S. Pat. No. 3,738,318 to Woodbridge et al and U.S. Pat. No. 4,196,694 to Buchanan.

However, these prior artificial cultch materials do not satisfy all the optimum criteria for cultch discussed above. Therefore, there exists a need in the art for a method of fostering an oyster bed which results in increased production of oysters from the bed. This invention addresses this need in the art, as well as other needs which will become apparent to those skilled in the art once given this disclosure.

SUMMARY OF THE INVENTION

The present invention provides a method of fostering shellfish beds to increase the production of existing beds or to start new beds.

The method provides for the distributing of rubber chunks or chips on the bottom of a body of water capable of supporting shellfish life. The rubber chunks or chips function as cultch to enhance the growth of the shellfish.

The rubber chunks or chips may be formed by chopping or shredding old tires.

The method of this invention has may advantages over the prior art methods of fostering shellfish beds.

One advantage is that the method according to this invention provides a cultch that is inexpensive and readily available. Another advantage is that this method provides a cultch which is non-corrosive and can be reused a number of times.

Yet another advantage of the method of this invention is that it provides cultch that resists sinking into mud or sand which may be located on the bottom of the body of water and resists being washed away by underwater currents and/or storms.

A further advantage of the invention is that it provides a cultch that resists slime build up on its surface and from which the oysters are easily removed at harvest.

Yet another advantage of this invention is that it provides a useful function for used tires, which otherwise would most likely be disposed of in a manner detrimental to the environment (e.g., by burning). Since old tires do not have a detrimental effect on the environment when used according to this invention, this invention has a clear and definite positive environmental impact.

Yet another advantage is that the rubber pieces do not settle or "pack" within themselves as oyster shells and other present cultch materials do. This assures that the growing shellfish will continuously have sufficient oxygen. This promotes maximum rate of growth of the oysters.

Other advantages and salient features of the present invention will become apparent from the following detailed description.

DETAILED DESCRIPTION OF THE INVENTION

Figure 1:
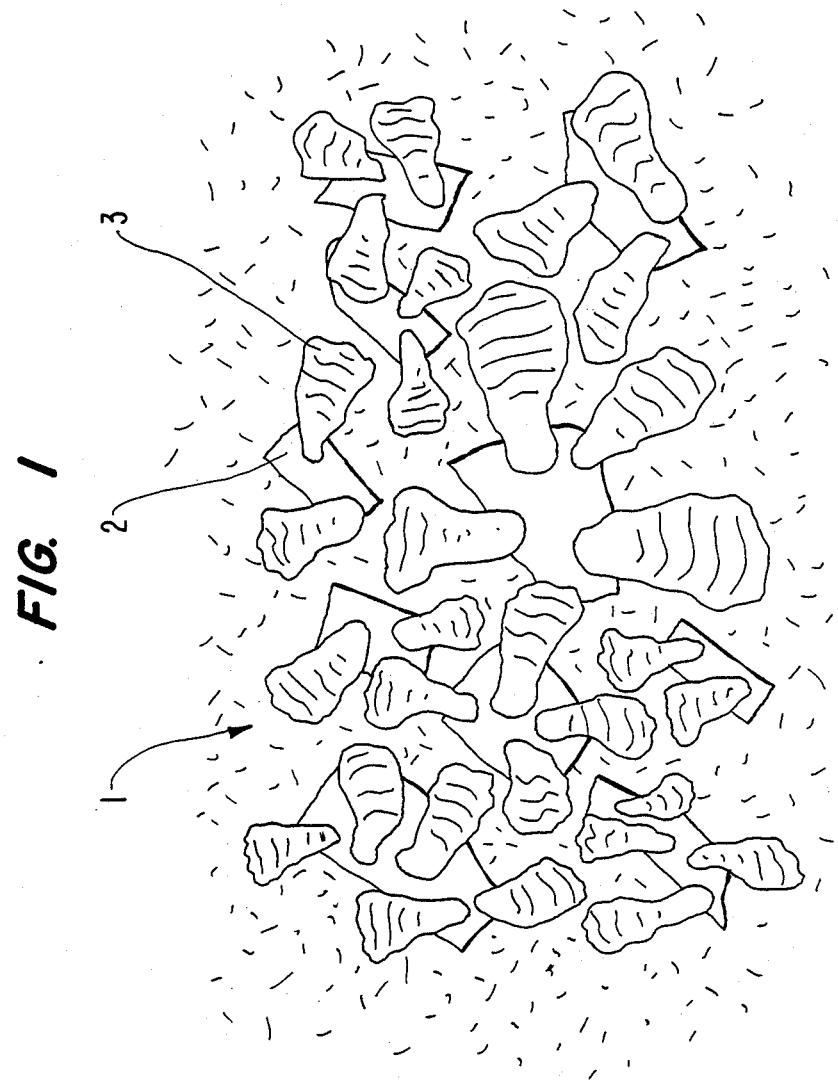
FIG. 1 is a top plan view of an oyster bed illustrating the employment of the present invention to form an artificial oyster bed.

Referring now to FIG. 1, artificial oyster bed 1 is formed by distributing chopped or shredded rubber chunks chips 2 to which the oysters 3 attach themselves on the bottom of a suitable body of water.

The rubber chips 2 function as cultch and are preferably old tires which are chopped or shredded into chips or chunks ranging in dimensions from one to four inches.

The desirable density of the distribution of chips 2 varies with the bottom of the body of water. If the bottom is very soft, such as soft mud or sand, then the chips 2 should be piled in a pile having at least a few inches of depth, or at least such that the top layer is above the bottom surface. If the bottom is very hard, such as a rock bottom, then the chips may be spread as shown in FIG. 1, that being a single layer of spaced chips.

As stated the rubber chips or chunks 2 preferably can be produced by chopping or shredding old tires. Due to the abundant number of old tires available the rubber chips 2 may be very inexpensive to make. In fact the disposal of rubber tires is posing an environmental problem in the United States. The tires do not decompose if buried, and burning of the tires results in the release of elements harmful to the environment.

The use of rubber tire chips 2 has proven to be an extremely effective method of forming an oyster bed. The rubber tire chips 2 sit on the oyster bed in such a manner as to provide an improved current flow through the bed, when compared to the cultches used in the prior art. Thus, the oysters are provided with more food and oxygen than the prior art cultches. This results in an increase in the number of oysters which attach themselves to the cultch and a substantial increase in their growth rate.

The use of rubber tire chips 2 results in the many advantages over the prior art methods of fostering oyster beds as dicsussed above. In summary, the tire chips do not deteriorate, thus they can be reused many times over. Also, the rubber tire chips 2 resist sinking into the mud, and do not drift away in underwater currents or during a storm. Another advantage is that the rubber tire chips are very resistant to slime build up. Further, the chips are relatively easy to remove to harvest the mature oysers.

It will be understood by those skilled in the art that various modifications, improvements and other embodiments can be made without departing from the scope of the invention as defined in the following claims. Such modifications, improvements and other embodiments are considered to be within the scope of this invention as defined by the following claims:

What is claimed is:

1. The method of fostering shellfish beds comprising the step of
    distributing rubber chips on the bottom of a body of water capable of supporting shellfish life to enhance the growth of the shellfish.
2. The method according to claim 1, including the step of chopping or shredding tires to form the rubber chips.
3. The method according to claim 1, including the step of chopping or shredding pieces of rubber into chips ranging in size from a minimum dimension of one inch to a maximum dimension of four inches.
4. The method according to claim 1, wherein the shellfish are oysters.
5. The method of fostering shellfish beds comprising the steps of
    chopping rubber tires to form chunks of rubber,
    transporting the chunks of rubber to a body of water suitable for shellfish growth, and
    distributing the chunks of rubber on the bottom of the body of water.
6. The method of fostering shellfish beds according to claim 5 further comprising the steps of
    removing the chunks of rubber from the bottom of the body of water after shellfish have matured on the chunks of rubber, and
    harvesting the matured shellfish.
7. The method of fostering shellfish beds according to claim 6, further comprising the step of
    returning the chunks of rubber to the bottom of the body of water after harvesting the matured shellfish.

* * * * *